（12）United States Patent
Mounier et al.

(10) Patent No.: US 8,424,770 B2
(45) Date of Patent: Apr. 23, 2013

(54) METHOD AND DEVICE FOR CUSTOMIZING A PORTABLE ELECTRONIC ENTITY

(75) Inventors: Regis Mounier, Boulogne-Billancourt (FR); Jean-Marc Louis, Herblay (FR)

(73) Assignee: Oberthur Technologies, Levallois-Perret (FR)

( * ) Notice: Subject to any disclaimer, the term of this patent is extended or adjusted under 35 U.S.C. 154(b) by 441 days.

(21) Appl. No.: 12/513,716

(22) PCT Filed: Oct. 30, 2007

(86) PCT No.: PCT/FR2007/001799
§ 371 (c)(1),
(2), (4) Date: May 6, 2009

(87) PCT Pub. No.: WO2008/065265
PCT Pub. Date: Jun. 5, 2008

(65) Prior Publication Data
US 2009/0235037 A1　Sep. 17, 2009

(30) Foreign Application Priority Data
Nov. 7, 2006　(FR) ...................................... 06 54767

(51) Int. Cl.
*G06K 19/06*　(2006.01)
(52) U.S. Cl.
USPC ............ 235/492; 235/375; 235/380; 235/487
(58) Field of Classification Search .................. 235/375, 235/380, 487, 492
See application file for complete search history.

(56) References Cited

U.S. PATENT DOCUMENTS

| 5,889,941 | A  | * | 3/1999 | Tushie et al. .................... 726/26 |
| 6,196,459 | B1 | * | 3/2001 | Goman et al. ................. 235/380 |
| 6,575,360 | B1 | * | 6/2003 | Hagn ............................ 235/380 |

FOREIGN PATENT DOCUMENTS

| EP | 1 376 453 | 1/2004 |
| EP | 1 434 168 | 6/2004 |

OTHER PUBLICATIONS

International Search Report dated Jun. 4, 2008, from corresponding PCT application.

\* cited by examiner

*Primary Examiner* — Allyson Trail
(74) *Attorney, Agent, or Firm* — Young & Thompson

(57) ABSTRACT

A device (200) for customizing a portable electronic entity (100), that includes: elements for storing a plurality of groups of customization data; elements (280) for communication with a non-rewritable memory (130) of the portable electronic entity, for receiving a first identifier (415) stored in the non-rewritable memory; elements for selecting at least one group of customization data according to the first identifier; and elements (240) for customizing the portable electronic entity according to each selected group of customization data. Preferably, the elements for storing a plurality of groups of customization data are designed so that each group of customization data is associated with a second identifier, the device includes elements for associating a second identifier with the first identifier, and the selection elements are designed in order to select at least one group of data according to the second identifier corresponding to the first identifier.

19 Claims, 8 Drawing Sheets

METHOD AND DEVICE FOR CUSTOMIZING A PORTABLE ELECTRONIC ENTITY

The invention relates to a method and a device for customizing a portable electronic entity. It applies in particular to the customization of microcircuit cards according to user profiles.

BACKGROUND OF THE INVENTION

The invention relates to portable electronic entities comprising, in particular, microcircuit cards, memory cards such as a memory card for storing digital data, for example a "Secure Digital" card or SD card (registered trademark), a USB (universal serial bus) key, a MultiMediaCard, also called MMC (registered trademarks), a SmartMedia card (registered trademark), a multimedia mini-card or a PDA (personal digital assistant), also called organizer. The microcircuit card is, for example, compliant with the ISO 7816 standard. It may, for example, be a secured microcontroller card.

The use of an electronic entity in a determined application context requires the storage, in the electronic entity, of data and/or programs that are likely to be used in this context. This is why a customization step is often used, in particular for portable electronic entities, during which the data specific to the electronic entity is written into a memory of said electronic entity, such as, for example, the identity of the cardholder.

The customization is performed by a customization station which processes the customization data. It should be noted that this customization is not limited to the "electrical" customization of the memory but can, on the contrary, extend to the graphic or physical customization of the portable electronic entity, for example by printing or embossing techniques.

The portable electronic entity includes a rewritable non-volatile memory, for example, an EEPROM (electrically erasable and programmable read-only memory). The electrical customization mainly involves a step for initialization of this non-volatile memory and thus of the portable electronic entity. This memory is particularly designed for the storage of this type of data that varies from one electronic entity to the next.

It should be noted that, before this initialization, the portable electronic entity cannot function. It can only be customized. Similarly, before the customization step, the non-volatile memory may be empty or almost empty, meaning that it is not initialized.

The step for initialization of the non-volatile memory is a step during which information specific to the application functions of the portable electronic entity and/or specific to each holder of the portable electronic entity is stored in the non-volatile memory. The customization data is generally stored in a rewritable non-volatile memory.

The overall structure of the customization data to be written into this memory is, on the other hand, common to a set of cards of the same type and thus helps to define a customization profile associated with this type of card.

A customization profile is thus a set of data that is associated with a type of card and that defines the general characteristics of the customization of the cards of this type, such as the structure of the data, including, where appropriate, program data, and the common data to be written into the electronic entity on customization, or even physical customization data, for example characters to be embossed or coding of the magnetic strip, or graphic, for example logo to be printed on the surface of the card.

The definition of a customization profile is particularly complex since it needs to coherently observe a set of criteria associated with the structure and the future use of the electronic entity, namely, for example, the standards, GSM (global system for mobile) for example in mobile telephony or EMV (Europay, Mastercard and Visa, registered trademarks) in the banking domain, and the existing applications, for example Visa or Mastercard (registered trademarks), and the internal hardware organization of the electronic entity.

Such a definition is therefore, conventionally, fairly difficult to implement and a risk of error cannot be discounted even when the definition of the profile is carried out by experienced personnel.

In a microcircuit card compliant with the ISO 7816 standard, the microcircuit is generally a secured microcontroller containing in its ROM memory an operating system and/or applications. The image of this read-only memory, that is called "mask", is generally defined by the card manufacturer in a design stage, and can change over time, notably with an upgrade or a bug fix.

When microcircuit cards are manufactured, the microcontrollers are shipped by the semiconductor manufacturer with a given mask. The operating system of each mask includes a specific coding of the commands.

In the method described in the U.S. Pat. No. 5,889,941, this coding is stored during the customization step in an operating system file.

As for chip cards, they are generally manufactured and customized in batches of cards of one and the same type (for example, in the banking domain, same bank, same card type, etc.). Within each batch, there is just one type of mask.

Thus, in the method described in the U.S. Pat. No. 5,889,941, mentioned hereinabove, only a single operating system file is used for each batch, therefore each microcontroller of the cards of one and the same batch has the same mask. Such is also the method described in the U.S. Pat. No. 6,196,459, which is based on working in batches.

It will be clearly understood that there is a particular interest in being able to customize cards that have different masks within one and the same batch, for example to simplify the microcontroller stock management.

Known from the prior art is a solution that makes it possible to provide a customization of each card with data relating to a person, described in patent EP 0 706 150. However, this solution has the drawback of requiring the writing of an identifier in the card's rewritable memory, which increases costs, because, for this, a customization machine must be used.

In the method described in U.S. Pat. No. 6,196,459, an identifier of the card object is transmitted by a controller to the customization station, then the customization station transmits the identifier to the server.

In the U.S. Pat. No. 6,575,360, a customization system includes a chip card control system and a chip card administration system. The chip card control system provides the interface with the chip card and transmits transparently, that is, without processing other than decoding or encoding, on the one hand, the commands generated by the administration system addressed to the chip card and, on the other hand, the responses to these commands generated by the chip card addressed to the administration system.

According to this patent, the ATR ("answer to reset") can be part of the application execution request and relates to the communication protocol with which it is possible to communicate with the card (protocol type, frequency, etc.). Furthermore, in this patent, processing batches of cards that are a priori different is not envisaged.

The system described in this patent also presents the drawback of requiring major interchanges between the chip card control system and the chip card administration system. Furthermore, the control system is on standby, that is, performs no processing, between the moment when it supplies a response generated by the card to the administration system and the moment when it receives a new command from the administration system. Consequently, in a system in which several thousands or tens of thousands of cards have to be processed every hour, these interchanges can limit the rate of customization of the cards, in particular when a single administration system is used for communication with several customization stations.

The present invention seeks to remedy these drawbacks and, in particular, to enable the customization of different cards with the same customization system, that is, customization server and station.

SUMMARY OF THE INVENTION

To this end, the present invention relates, according to a first aspect, to a device for customizing a portable electronic entity, characterized in that it includes:

means of storing a plurality of groups of customization data, means of communicating with a non-rewritable memory of said portable electronic entity, for receiving a first identifier retained in said non-rewritable memory, means of selecting at least one group of customization data according to the first identifier, and means of customizing said portable electronic entity according to each selected group of customization data.

Thanks to these provisions, the customization device can simply perform the customization of batches of electronic entities comprising different platforms in terms of circuits and/or operating systems. Because the first identifier originates from the non-rewritable memory (ROM) of the portable electronic entity, this first identifier is available from before the customization step and can identify technical, hardware and/or software characteristics of the portable electronic entity.

It will be observed that the customization device as briefly described hereinabove can be incorporated in a customization server or in a customization station.

According to particular features, the means of storing a plurality of groups of customization data are designed so that each group of customization data is associated with a second identifier, the device includes means of associating a second identifier with said first identifier, and the selection means are adapted to select at least one group of customization data according to the second identifier corresponding to the first identifier.

Thanks to these provisions, the correlation of the customization data with the first identifiers is more flexible since the same group of customization data can be associated with several first identifiers, without all the groups of customization data associated with these first identifiers being common. Furthermore, the groups of customization data can be generated independently of the first identifiers and then correlated with some of the first identifiers.

According to particular features, the communication means are designed so that the first identifier is at least a part of a message supplied by the portable electronic entity when it was powered up.

According to particular features, the communication means are designed so that said electronic entity conforms at least partly to the ISO 7816 standard and so that said message is an ATR ("answer to reset").

Thanks to each of these provisions, from the first time the portable electronic entity is powered up, the customization device as briefly described hereinabove has the first identifier. The customization process does not therefore need to interrogate the portable electronic entity and can therefore be faster, less expensive and more reliable.

According to particular features, the communication means are adapted to perform a reset of the portable electronic entity and to receive the first identifier in at least part of a message supplied by the portable electronic entity when it was reset.

According to particular features, the communication means are adapted to receive a first identifier that includes at least one "history" byte according to the ISO 7816 standard (bytes T1, T2, . . . T9) of the ATR.

Thanks to each of these provisions, the implementation of the present invention is particularly easy and reliable since the message supplied by the portable electronic entity on its power-up is always identical and does not depend on a specific instruction transmitted by the customization station. The invention is therefore particularly practical to implement, particularly in a microcircuit card.

According to particular features, the storage means are designed so that said groups of customization data include at least one image of the structure of the non-volatile memory of the portable electronic entity. It is thus possible to prepare the customization data so that, when the device obtains the first identifier, for example the ATR, there is less processing required to obtain the customization data.

According to particular features, said structure image is also representative of the content and file size of the portable electronic entity.

According to particular features, said structure image is representative of the memory areas of the portable electronic entity containing variables, and their value, excluding data specific to the future holder of the portable electronic entity.

According to particular features, the customization means are adapted to complete the blank fields of said structure image with customization data.

According to particular features, the electronic entity is a secured microcontroller card conforming at least partly to the ISO 7816 standard.

According to particular features, the customization means are adapted to form at least one customization instruction from said selected group of customization data.

According to particular features, at least one customization instruction is an instruction that can be directly understood and executed by the portable electronic entity.

Thanks to these provisions, the customization station does not have to interpret the customization instructions that are directly comprehensible to and executable by the portable electronic entity and only has to transmit them to it.

According to particular features, the customization means are designed so that at least one customization instruction enables the writing, by the portable electronic entity, of data into the memory of the portable electronic entity.

According to particular features, the customization means are designed so that at least one customization instruction is specific to the future holder of the portable electronic entity.

According to particular features, the customization means are designed so that at least one customization instruction is a command in the APDU format of the ISO 7816 standard.

According to particular features, the customization means are designed so that at least one customization instruction is a specific instruction representative of the end of customization of a portable electronic entity.

According to particular features, at least one group of customization data includes a customization profile, group of customization data common to all the portable electronic entities of one and the same type defined by a mask or by a mask and an integrated circuit.

According to particular features, the device as briefly described hereinabove includes a means of obtaining a customization profile adapted to:
- choose at least one application from a predefined list of applications;
- configure at least one parameter associated with each chosen application;
- select a hardware platform, from a list of compatible platforms determined according to at least one chosen application and at least one configured parameter; and
- obtain a customization profile according to at least one chosen application, at least one configured parameter and the selected platform.

According to particular features, the device as briefly described hereinabove includes a means of generating profiles and groups of customization data and a means of remotely storing said profiles and groups of customization data.

According to particular features, the portable electronic entity is a card or an identification document.

According to particular features, the portable electronic entity is of slave type.

According to particular features, the device as briefly described hereinabove includes:
- processing means adapted to process said customization data and to generate at least one group of instructions for customizing the portable electronic entity, at least one group of customization instructions including at least one customization control instruction enabling a customization station to control the correct execution of at least one customization instruction, and
- means of transmitting each group of customization instructions.

These particular provisions relate in particular to a device comprising a customization server. Thanks to each of these provisions, in order to improve the rates of customization:
- most of the processing operations are performed on a customization server, so limiting the processing operations performed by the customization stations;
- the data interchanges between the customization stations and the customization server are limited.

These objectives are reached in particular thanks to the generation of groups of customization instructions by the customization server. Thus, the customization server does not have to generate the customization instructions and does not have to request the customization instructions one by one.

Finally, the customization server also thus has a role for defining customization controls that are executed by the customization station. The fact that the customization station takes charge of these control instructions defined by the customization device makes it possible to limit the interchanges between the customization stations and the server, while minimizing the processing operations performed by the customization stations.

According to particular features, the processing means are also adapted to generate at least one customization report instruction enabling the customization station to confirm to the device that at least a part of a group of customization instructions has been correctly executed, and to insert at least one report instruction in at least one group of customization instructions, the transmission means being adapted to transmit at least one report instruction addressed to the customization station, the device also including means of receiving at least one report originating from the customization station. Thus, the device can verify whether or not the customization has been correctly performed.

The interchanges of instructions between the customization device and the customization station are thus limited to groups of customization instructions including both instructions to be executed on the portable electronic entity and report instructions.

According to particular features, the device as briefly described hereinabove also includes analysis means capable of analyzing at least one received report and initiating an action according to the result of said analysis. Thus, it is the server that handles the checking of customization and therefore the stations are relieved of processing tasks to the greatest possible extent.

According to particular features, the processing means include means of defining groups of customization instructions such that the device needs the execution report of at least one of the preceding instructions to generate the first instruction of the next group of customization instructions. Thanks to these provisions, the size of the groups of instructions is maximum and the interactions between the device and the customization station are reduced, which increases the rate of customization.

According to particular features, the communication means are adapted also to receive at least one identifier of said customization station. Thanks to each of these provisions, the server can generate the groups of customization instructions according to an identifier of the customization station, which limits the risks of error.

According to particular features, the processing means are adapted to generate at least one group of customization instructions in parallel with the execution of a group of customization instructions by the customization station. Thanks to these provisions, the rate of customization can be increased because immediately a group of customization instructions has been executed by the customization station, another group of customization instructions can be sent to it by the device, without having to wait for this new group of customization instructions to be prepared.

According to particular features, the device as briefly described hereinabove includes a server and the transmission means are adapted to transmit groups of customization instructions to a plurality of customization stations.

According to particular features, the device as briefly described hereinabove includes:
- means of receiving at least one group of customization instructions from the portable electronic entity, at least one group of instructions including at least one customization control instruction making it possible to control the correct execution of at least one customization instruction,
- means of transmitting at least one customization instruction to the portable electronic entity, and
- processing means adapted to process each control instruction to control the correct execution of at least one customization instruction by the portable electronic entity.

These provisions apply more particularly to the customization stations. Thanks to these provisions, in order to improve the rates of customization:

most of the processing operations are performed on a customization server, so limiting the processing operations performed by the customization stations;

the data interchanges between the customization stations and the customization server are limited.

These objectives are reached in particular thanks to the generation of groups of customization instructions by the customization server. Thus, the customization station does not have to generate the customization instructions and does not have to request the customization instructions one by one.

Finally, the customization server thus also has a role for defining customization controls that are executed by the customization station. The fact that the customization station takes charge of these control instructions defined by the customization device means that the interchanges between the customization stations and the server can be limited, while minimizing the processing operations performed by the customization stations.

According to particular features, the processing means are adapted to perform at least one control instruction on at least one customization instruction after the transmission means have transmitted, to the portable electronic entity, another customization instruction unaffected by said control instruction. Thus, by waiting for the response from the electronic entity to a customization instruction, the customization station can analyze the response to the preceding customization instruction and insert the necessary information into said report.

According to particular features, the reception means are also adapted to receive at least one customization report instruction and the processing means are also adapted to prepare an execution report on at least one group of customization instructions, the device also including means of transmitting reports addressed to a customization server.

According to particular features, the reception means are adapted to extract at least one report instruction from at least one group of customization instructions.

According to particular features, the processing means include a buffer memory storing the customization instructions transmitted to the portable electronic entity and the results of the execution of at least a part of the customization control instructions, a report including all or part of the content of said buffer memory.

According to particular features, said transmission means are adapted to associate an identifier of the device with each portable electronic entity identifier.

According to particular features, the device as briefly described hereinabove includes means of transmitting an end-of-batch message.

According to particular features, the device as briefly described hereinabove includes error detection means and means of transmitting an error message.

According to particular features, at least one control instruction is the expected result of the execution, by the portable electronic entity, of a customization instruction. The control is therefore particularly easy to implement. The control of the expected result of the execution, by the portable electronic entity, of a customization instruction, is the minimum control instruction that makes it possible to minimize the processing operations performed by the customization station and the interchanges between the customization station and the server.

According to particular features, at least one control instruction is a response, in the APDU format of the ISO 7816 standard, to a customization instruction. The present invention thus applies to the electronic entities that implement this standard.

According to particular features, at least one control instruction is one of the following instructions:
a command to power up the portable electronic entity,
a command to power down the portable electronic entity,
a command to select the applied clock of the portable electronic entity,
a command to determine a communication protocol between the customization station and the portable electronic entity,
a command to select the voltage applied to the portable electronic entity,
a command to suspend customization for a determined duration,
a command to specify to the customization station a maximum waiting time to obtain a response from the portable electronic entity,
a command to insert a waiting time before each command sent to the portable electronic entity,
a command to insert data in said report transmitted for the attention of the server,
an end-of-customization command, and/or
a customization error information command.

According to a second aspect, the present invention relates to a method of customizing a portable electronic entity, characterized in that it comprises:
a step for storing, in a customization device, a plurality of groups of customization data,
a step for communicating with a non-rewritable memory of said portable electronic entity to receive a first identifier retained in said non-rewritable memory,
a step for selecting, by said customization device, at least one group of customization data according to the first identifier, and
a step for customizing said portable electronic entity according to each selected group of customization data.

According to particular features, the method as briefly described hereinabove comprises:
a step for processing said customization data and generating at least one group of instructions for customizing said portable electronic entity, at least one group of customization instructions including at least one customization control instruction making it possible for a customization station to control the correct execution of at least one customization instruction, and
a step for transmitting each group of customization instructions.

According to particular features, the method as briefly described hereinabove comprises:
a step for receiving at least one group of customization instructions from the portable electronic entity, at least one group of instructions including at least one customization control instruction making it possible to control the correct execution of at least one customization instruction,
a step for transmitting at least one customization instruction to the portable electronic entity, and
a step for processing each control instruction to control the correct execution of at least one customization instruction by the portable electronic entity.

The benefits, aims and features of the method that is the subject of the second aspect of the present invention are similar to those of the device that is the subject of the first aspect of the present invention, so they are not reviewed here.

BRIEF DESCRIPTION OF THE DRAWINGS

Other aims, features and benefits of the invention will become apparent with reference to the following description, given, for explanatory purposes in a by no means limiting way, in light of the appended drawings, in which.

DETAILED DESCRIPTION OF THE PREFERRED EMBODIMENTS

The invention relates to the customization of a portable electronic entity. It will be recalled that, during such a customization, data is written into a memory of the electronic entity that is specific to that entity, to application functions of the entity, for example, types of services allowed, security and cryptographic functions, sometimes called initialization data, and/or specific to the future holder of the portable electronic entity, for example, the name, the account or telephone number, the validity limit date and/or a photograph. The customization covers, in particular, the production of software masks, or "soft masks", in the case of a microcircuit card.

It will be observed that, in certain documents of the prior art, a distinction is drawn between the concept of initialization and that of customization. According to the present invention, these two concepts are combined under the same term of "customization", even though these steps can be separate, and performed, for example, by different customization stations, for security reasons for example.

Figure 1:
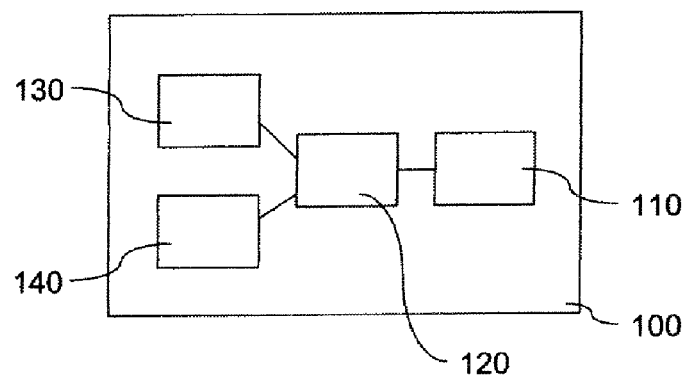
FIG. 1 diagrammatically represents a portable electronic entity to the customization of which the present invention is applied, FIG. 2 diagrammatically represents a particular embodiment of a system, a server and a customization station that are subjects of the present invention.

An exemplary portable electronic entity 100 is represented in FIG. 1. This portable electronic entity 100 can be a microcircuit card compliant with the ISO 7816 standard, an identification document, a USB key, a PDA, or a microcircuit card compliant for example with the MMC (MultiMediaCard) specification including a memory of flash type for example. It can also be a contactless chip card or a so-called dual card, that is, a card comprising a contactless interface and a contact interface, for example compliant with the ISO 14443 standard. The portable electronic entity 100 can also be a passport that includes, in the thickness of the cover, a secured microcontroller provided with contactless communication means compliant with the ISO 14443 standard.

In the case of a microcircuit card compliant with the ISO 7816 standard, and from an application point of view, the portable electronic entity 100 is in particular a secured identification card or a secured identification document, that is, for example, a bank card, an identification card of a subscriber to a mobile telephony network, or an official or transport card or document (transport card, identity card, motor vehicle identification card like the French "carte grise", and so on).

In the embodiment illustrated in FIG. 1, the portable electronic entity 100 is a microcircuit card of dimensions preferably compliant with the ISO 7816 standard, in particular 0.76 mm thick. It comprises an interface 110 for inputs/outputs, power supply and provision of a clock signal, a secured microcontroller 120, a ROM read-only memory 130 and an EEPROM rewritable memory 140.

The interface 110 can include a communication interface with or without contact or a so-called dual interface, that is, an interface comprising a short range contactless interface and a contact interface.

The read-only memory 130 retains an operating system that enables the portable electronic entity 100 to operate, that is, to receive and execute instructions or commands compliant with the ISO 7816 standard, and secure the portable electronic entity 100.

Customizing the portable electronic entity entails, in particular, initializing the memory 140 by creating files and/or variables, for example in the form of a structure known by the name TLV (tag length value).

According to one operating mode, the portable electronic entity 100 is of slave type, in that the electronic entity simply responds to commands from the master terminal. In one implementation of the invention within a microcircuit card, the master terminal is, in particular, a card reader. In this case, the portable electronic entity, with microcircuit, is preferably compliant with the ISO 7816 standard. In this case, it is generally a secured microcontroller card.

Figure 2:
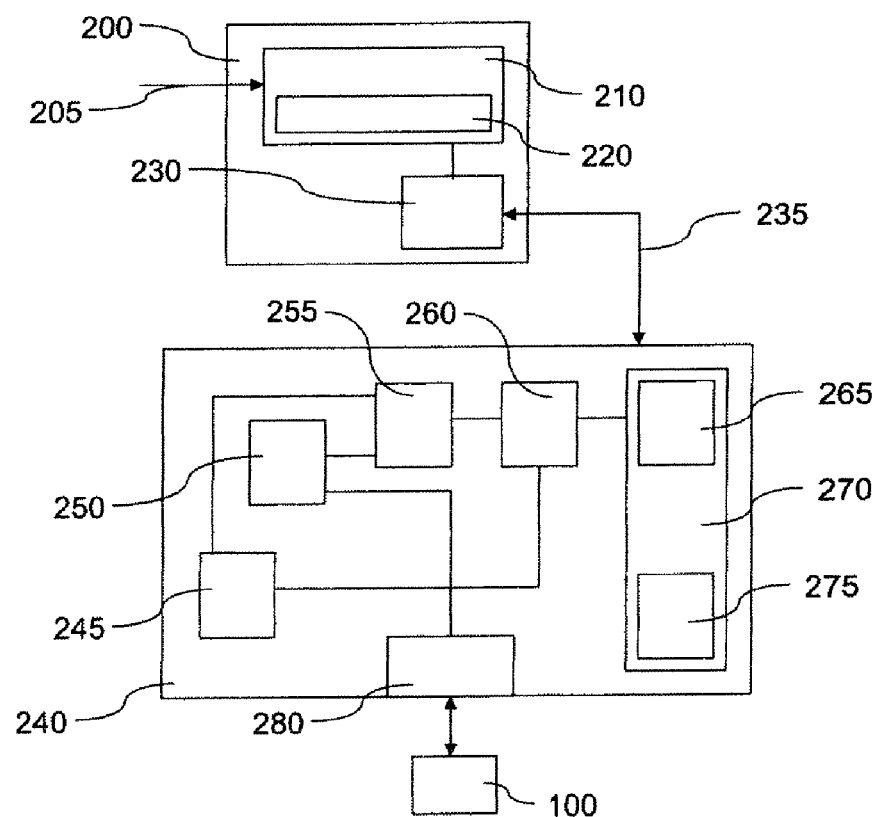

FIG. 2 shows a customization system comprising a customization server 200 and a customization station 240 communicating with a portable electronic entity 100.

The customization server 200 comprises a customization data input 205, a non-volatile memory 210, for example a hard disk, which retains a program 220 and a central processing unit CPU 230. The program 220 is a processing and control program generating groups of instructions from customization data and, possibly, from an identifier of the portable electronic entity 100.

The central processing unit CPU 230 and the program 220 together form processing means adapted to process customization data and identifiers of portable electronic entities and to generate at least one group of customization instructions for the portable electronic entity. Preferably, a group of customization instructions comprises more than one customization instruction.

The instructions generated by these processing means preferably comprise customization instructions, control instructions and report instructions. The customization instructions can be understood and executed by the portable electronic entity 100. According to the present invention, these customization instructions are grouped together, by the customization server 200, in groups of customization instructions, at least one group of instructions including a plurality of customization instructions and, explicitly or implicitly, at least one control instruction and, possibly, at least one report instruction.

The control instructions can be any instruction for the attention of the customization station 240 enabling it to control the execution of the customization instructions by the portable electronic entity 100. Preferably, the control instructions enable the customization station 240 to check the execution of each customization instruction by the portable electronic entity 100. Thus, these control instructions can define a maximum duration during which the customization station 240 can wait for a response to a customization instruction from the portable electronic entity 100. In this embodiment, said control instruction is advantageously the expected APDU-format response to a customization instruction in the form of an APDU-format command.

The report instructions determine in which cases and how the customization station 240 should communicate with the customization server 200 to indicate to it the correct execution of at least a part of a group of customization instructions for a portable electronic entity 100. Preferably, the report instruction is implicitly embodied in the end of the group of instructions, that is, each time the customization station 240 reaches the end of a group of instructions, it transmits, to the customization server 200, a report that represents the successful execution of each control instruction. This particular type of report instruction is particularly simple to implement. In other variants, the customization server 200 inserts explicit report instructions into the group of customization instructions.

Preferably, the processing and control means, that is, the non-volatile memory 210, the program 220 and the processing unit 230 of the server 200, include means of analyzing the reports received from the customization station, these analysis means comprising in particular the non-volatile memory 210 and the program 220.

Preferably, the processing and control means are adapted to generate at least one group of customization instructions in parallel with the execution, by the customization station, of another group of customization instructions.

Advantageously, the processing and control means of the server 200 include means of defining groups of instructions such that the customization server 200 needs the execution report of at least one of the preceding instructions to generate the first instruction of the next group of customization instructions. Thus, while groups of instructions are being generated, the means of defining groups of instructions determine, for each instruction, whether its generation requires an execution report from at least one of the preceding instructions. If such is the case, the means of defining groups of instructions finish the preceding group of instructions before this instruction to be generated according to this report and define a new group of customization instructions beginning with said instruction. This mode of operating of the means of defining groups of instructions makes it possible to minimize the interchanges between the server and the customization station.

For example, the first instruction of the new group of instructions is an instruction involved in a cryptographic process. According to another example, it is an instruction to store an element in the electronic entity (for example a flash memory card), the element to be stored depending on the memory space available in the electronic entity. The first instruction of the new group of instructions therefore needs the report on the execution of an instruction to determine the memory space available in said entity 100, an instruction which is, as explained hereinabove, in the preceding group of instructions.

As a variant, the number of instructions in the group of instructions can be fixed or determined by the expected size of said report.

The processing and control means 210 to 230 comprise means of transmitting control instructions for the customization station 240. This enables the customization server 200 to control the customization station 240 by using some of the means used for the groups of customization instructions.

The control instructions for the customization station 240 preferably include:

a command to power up the portable electronic entity,
a command to power down the portable electronic entity,
a command to select the clock applied to the portable electronic entity,
a command to determine a communication protocol between the customization station and the portable electronic entity. In an embodiment in which the portable electronic entity is a microcircuit card, said protocol selection command allows for a selection of the protocol T=1 and of the protocol T=0 defined in accordance with the ISO 7816 standard. In one embodiment, said protocol determination command can be used to negotiate the transmission speed for the data interchanged between the portable electronic entity and the customization station,
a command to select the voltage applied to the electronic entity,
a command to suspend customization for a determined time,
a command for specifying to the customization station a maximum waiting time to obtain a response from the portable electronic entity,
a command to insert a waiting time before each command sent to the portable electronic entity,
a command to insert data into said report transmitted for the attention of the server (benefit: facilitates the controls performed by the server),
an end-of-customization command, and/or
a customization error information command.

Preferably, the transmission means are adapted to transmit groups of customization instructions to a plurality of customization stations.

The customization server 200 communicates with each customization station 240 according to any protocol, preferably encrypted, via means 235 of transmitting each group of customization instructions addressed to the customization station 240 of the portable electronic entity 100. Conversely, the transmission means 235 constitute means of receiving, from the customization station 240, at least one identifier of the portable electronic entity 100 and customization instruction execution report.

The customization station 240 includes a non-volatile memory 270 retaining drivers 265 for driving the reader 280 of the portable electronic entity 100 and a program 275 for managing groups of customization instructions. The customization station 240 also includes a clock signal generator 245, a power supply 250, a circuit 255 for driving the reader 280 and a central processing unit CPU 260.

The central processing unit CPU 260 and the program 275 for managing groups of instructions constitute means of receiving at least one group of customization instructions for the portable electronic entity.

The reader 280 is provided with an interface with or without contact with the portable electronic entity 100. The reader 280 interchanges, with the portable electronic entity 100, instructions, or commands, and responses, for example in APDU format, clock and power supply signals, according to known techniques in the field of chip card readers. The central processing unit 260, the reader 280, the drivers 265 and the management program 275 thus constitute means of transmitting at least one customization instruction to the portable electronic entity 100.

The circuit 255 transmits to the generator 245 commands to determine a clock signal, to the power supply 250 commands to power up, cut off power supply and/or determine voltage, and to the reader 280 commands in the APDU format.

Before describing in more detail at least one particular embodiment of the device and of the method that are subjects of the present invention, some details are reviewed below concerning the implementation of the calculation of the ATR by a chip card compliant with the ISO 7816 standard, it being recalled here that the present invention is not limited to this type of card.

The program for calculating the ATR is part of the mask (or operating system) that is stored in the read-only memory ROM 130 of the portable electronic entity 100. This calculation program can use information from the non-volatile rewritable memory EEPROM 120 and from the read-only memory ROM 130. It will be seen that, for the calculation of the ATR, the memory 120 is not initialized.

Figure 3:
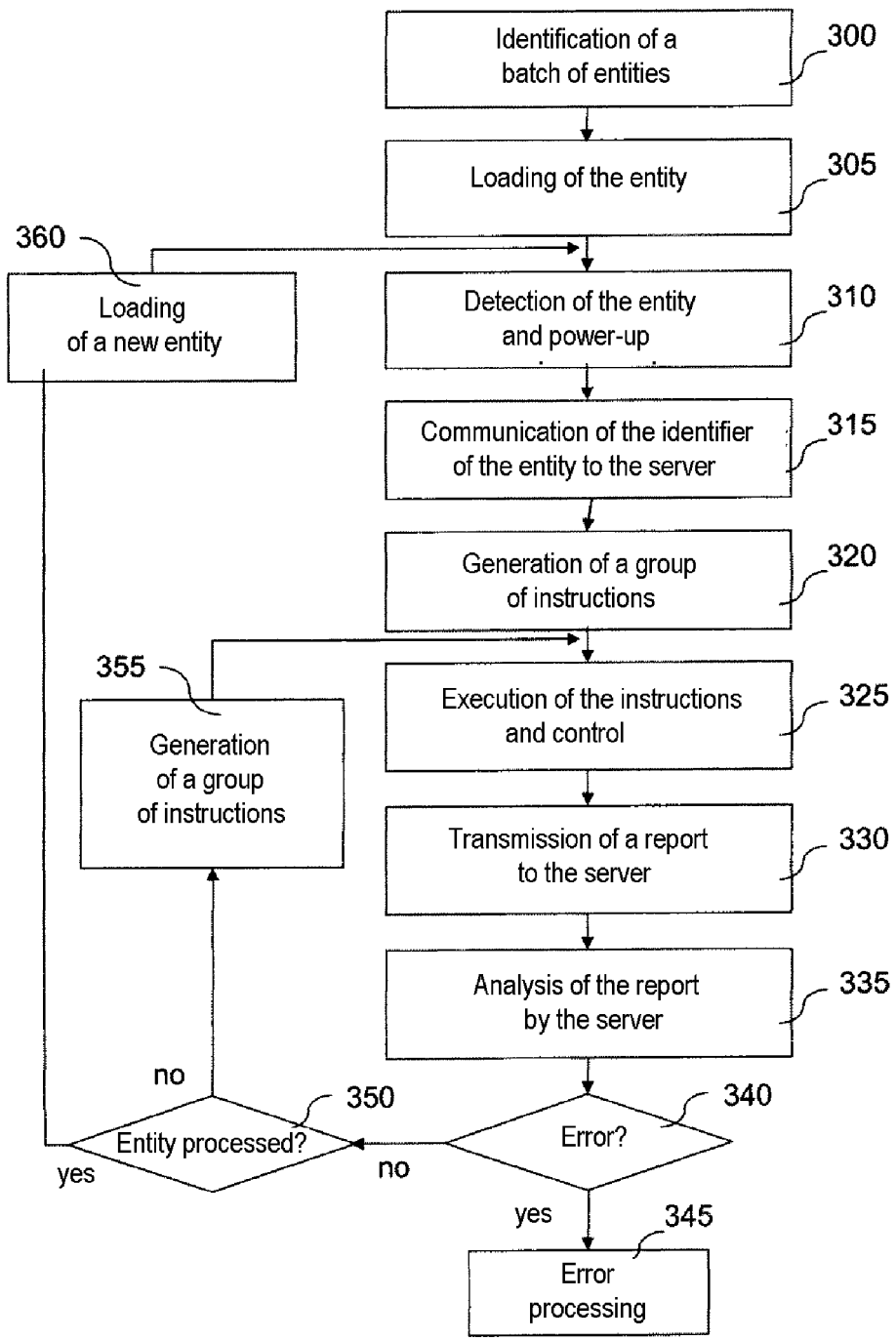
FIG. 3 is a flow diagram representing steps implemented in a particular embodiment of the customization method that is the subject of the present invention.

The operation of the customization station 240 is illustrated in FIG. 3.

During a step 300, the customization station 240 sends to the server 200 a customization initialization request including information identifying the batch of entities 100 to be customized in order to initialize the customization control processing means. In an embodiment described below with reference to FIG. 4, this identification information is a batch number, with which the server 200 will associate groups of customization data needed to customize portable electronic entities of the batch. This request can also include information identifying the customization station 240, in particular the station number in the customization workshop, enabling the server 200 to send it the response and, possibly, the type of customization station 240, the server 200 possibly needing this information to know the instructions that it can send to the station 240.

The server 200 then responds to the customization station 240, either by an error message, notably if the batch number is invalid, or by an acknowledgement if no problem has been encountered.

During a step 305, the customization station 240 performs an automatic loading of a portable electronic entity 100 into the reader 280, according to techniques that are known per se. Then, during a step 310, the customization station 240 detects and powers up the portable electronic entity 100.

During a step 315, the customization station 240 receives the identifier of the portable electronic entity 100 and communicates the identifier of this portable electronic entity 100 to the server 200 together with a request for a group of customization instructions.

During a step 320, according to the identifier of the portable electronic entity plus received customization data, the customization server 200 generates a group of customization instructions and transmits it to the customization station 240, preferably in encrypted, coded or ciphered form.

Preferably, during this step 320, the customization server 200 defines the first group of customization instructions for this group of instructions to be completed only when, to generate the next instruction, the server 200 needs an execution report of at least one of the preceding instructions.

The detail of the step 320 is given, later, with reference to FIG. 4, together with a description of preliminary steps 400 and 405 implemented by the customization server 200 or by another computer (not represented) linked to the server 200.

During a step 325, the customization station 240 receives the group of customization instructions and transmits each APDU-format command of the group of instructions to the portable electronic entity 100.

The customization data of the portable electronic entity is then stored in its memory, generally in a rewritable non-volatile memory, for example a memory of the EEPROM type, particularly suited to the storage of this type of data that varies from one entity to another.

Preferably, the customization station 240 performs at least one control instruction for at least one customization instruction after having transmitted, to the portable electronic entity, another customization instruction not affected by this control instruction.

If, for an APDU-format command, no control instruction incorporated in the group of customization instructions received relates to this APDU-format instruction, the station 240 waits for a standard code from the entity 100 indicating that the customization instruction has indeed been executed and verifies this standard code.

Otherwise, the station 240 waits for a specific APDU-format response in a specific timeslot, if this specific response and/or this specific timeslot are specified in a control instruction incorporated in the group of customization instructions received.

In case of a problem, that is, depending on the case, if the standard code or the expected response is not received during the specific timeslot, the customization of the entity 100 is interrupted and a customization interruption message is transmitted, by the customization station 240, to the server 200.

If there are no problems, each response is placed in a buffer memory, in chronological order with other customization progress report information (for example: date, time, identifier of the entity 100).

When the customization station 240 has received from the portable electronic entity all the responses associated with the customization instructions (or a predetermined time has elapsed without receiving an expected response, indicating an anomaly), the station 240 transmits, to the server 200, a report message, for example including the content of a buffer memory containing the responses concerned.

On receipt of each report message, the server 200 analyzes the report, in the step 335, and determines whether it should trigger an action according to the result of this analysis. The server determines in particular whether an error has been detected during the step 340. If it has, during a step 345, the error is processed. For example, a message to eject the entity 100 to a scrap facility is transmitted to the customization station 240. Otherwise, during a step 350, the customization server determines whether the customization of the portable electronic entity 100 is finished. If it is, during a step 360, a new portable electronic entity is loaded into the reader 280 and the process returns to the step 310. Otherwise, during a step 355, according to the identifier of the portable electronic entity, from the report or reports received, plus the received customization data, the customization server 200 generates a new group of customization instructions and transmits them to the customization station 240, preferably in encrypted, coded or ciphered form.

Preferably, during this step 355, the customization server 200 defines the new group of customization instructions for this group of instructions to be completed only when, for the next instruction, the server 200 needs the execution report for at least one of the preceding instructions.

Then, the process returns to the step 325.

Figure 4:
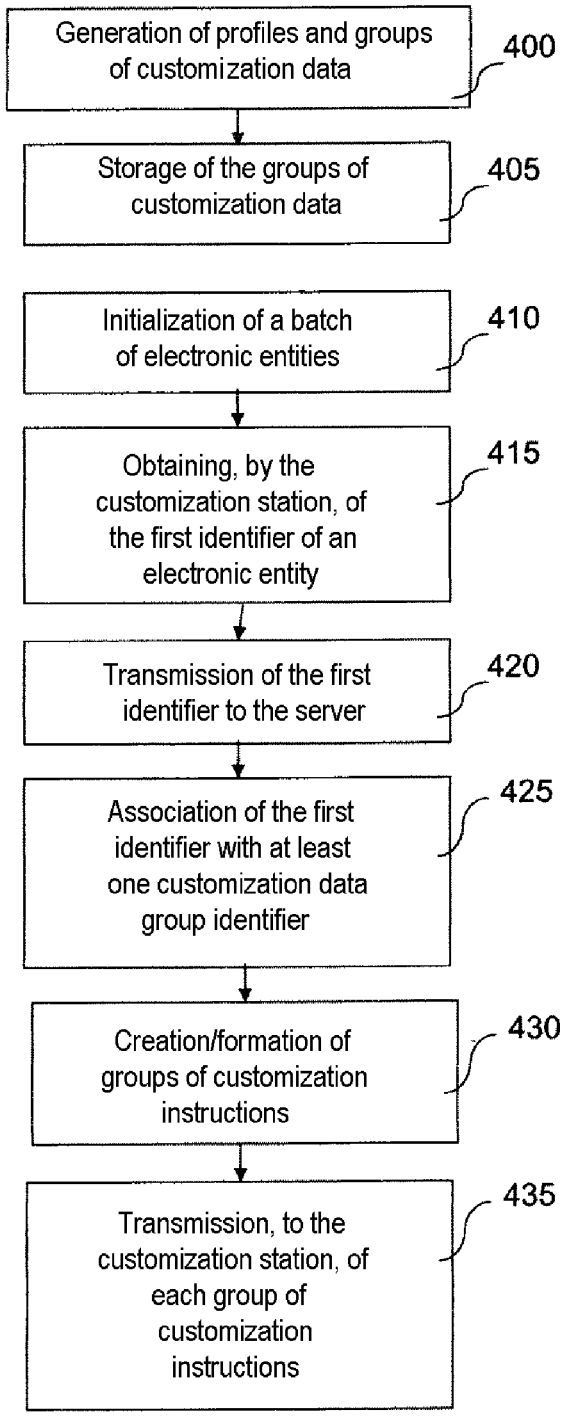
FIG. 4 is a flow diagram representing steps implemented in a particular embodiment of the method that is the subject of the present invention, FIGS. 5A to 5I diagrammatically represent data frames interchanged between different entities to implement a particular embodiment of the method that is the subject of the present invention.

FIG. 4 illustrates steps 400 and 405 performed prior to the step 300 and steps 410 to 435 performed during the step 320. As illustrated in FIG. 4, during step 400, customization profiles are defined, these being sets of data associated with a type of portable electronic entity and that define the general characteristics of the customization of the entities of this type, such as the structure of the data (including, possibly, application program) and the common data to be written into the electronic entity memories, or even physical customization data (characters to be embossed, coding of the magnetic strip, etc.) or graphic customization data (logo to be printed on the surface of the card, for example).

For example, the profiles include a maximum length of the name of the holder, linguistic preferences, identifications of authorized networks and/or prohibited networks, a validity time and technical choices of the entity distributor.

The rest of the description of FIG. 4 relates to the portable electronic entities compliant with the ISO 7816 standard.

The definition of a customization profile observes a set of criteria associated with the structure and the future use of the electronic entity, namely, for example, the standards (for example, GSM in telephony or EMV in the banking domain) and existing applications (for example, Visa, Mastercard, registered trademarks), and the internal organization (hardware) of the electronic entity.

Preferably, during the step 400, for each profile, the following steps are carried out:
- choice of at least one application from a predefined list of applications;
- configuration of the parameters associated with each chosen application;
- selection of a hardware platform, that is, a type of portable electronic entity, from a list of compatible platforms determined according to the chosen applications and the configured parameters;
- obtaining of the customization profile according to the chosen applications, the configured parameters and the selected platform.

The generation of the customization profile data is thus simplified. In practice, the choice of application makes it possible to limit considerably the possible solutions for the other customization data, which simplifies the generation of configuration profile data and makes it easy to implement in interactive form, for example by means of a computer system.

A more functional approach is also obtained, which makes it possible to focus on the choices of the client of the customization service, that is, the distributor of portable electronic entities, for example a bank, a telephone operator or a public authority, by minimizing the technical knowledge (in particular in the microcircuit card domain) necessary to generate the customization profile. Finally, the consistency of all the elements involved for the definition of the profile is assured, since the compatibility of the applications, of their configuration and of the platform used evolves from the proposed solution.

The step 400 begins with the choice of at least one application that the portable electronic entities to be customized need to be able to implement. The choice of each application is made from a predefined list, for example presented to the user of the system in interactive form, by means of a drop-down menu.

The consistency of the chosen applications is then checked. When the chosen applications do not generate any inconsistency, parameters relating to each of the chosen applications are configured. For example, the phonebook of a mobile telephone is configured by entering the phonebook parameters as defined in the corresponding mobile telephony standard. There are thus defined, for example, a maximum number of entries in the phonebook (max number of entries) equal to 250, a maximum length for the names (max length of name) equal to 16 bytes. This configuration therefore makes it possible to define in particular the size of the files for storing the phonebook in the rewritable memory of the portable electronic entity. Default configurations can also be defined for each application. The configuration step also includes a step for checking the consistency of the information entered or selected, in particular to ensure compliance with the corresponding standards.

In another example suited to the bank card domain, the preferred language of the future cardholder is determined by selecting it from a list of possible languages.

The choice of applications and of their configuration can then be stored, for example in the form of a database, which consequently gives a functional description of the customization profile, independently of the hardware platform (that is, the components and operating system) of the portable electronic entity. Such a database can thus be reused to introduce identical functionalities on another hardware platform. The database uses, for example, an object-type structure within which each choice of the user is stored as an instance of an object of one of the predefined classes.

Thanks in particular to the inheritance mechanism, the duplication of unnecessary codes is avoided, by defining general classes which describe a configuration profile and functionalities common to numerous applications, and by defining classes that describe functionalities specific to a given application inheriting more general class attributes.

Once the functional definition is determined, the platform for which the customization is intended is selected from a list of platforms compatible with the functional definition defined in the preceding steps (for example, because of an adequate memory capacity and a capacity to implement a particular application, such as JavaCard).

The platforms are, for example, defined by the association of a component (generally, integrated circuit of the entity to be customized) and an operating system (generally called "mask" in the microcircuit card domain).

Provision can be made to display, in association with each compatible platform, information to facilitate the choice of a platform, such as, for example, cost, reliability and procurement information, and previous use references.

Once the choice of the platform has been validated, the memory image of the card (IC card image) is generated on the basis of the elements given previously, this memory image defining the data in the EEPROM memory, apart from the elements specific to the future holder of the entity, for example in the form of an object. This image represents, in particular, the file structure of the EEPROM memory (compliant with the ISO 7816 standard), and the content and the size of the files that were determined when generating the customization profile. In addition to describing the files and their structure, the memory image contains all the other information defining the EEPROM memory of the portable electronic entity, such as the memory areas containing variables, and their values, apart from the data specific to the future holder.

These variables are, for example, stored in TLV (tag length value) form, that is, in succession, identifier, length, value. The abovementioned configuration steps can in fact generate data in this form, the value being fixed in this step or to be defined later depending on whether it is common or not to all the future holders of portable electronic entities.

The structure of two images can thus differ although the services rendered by the entities that implement them are identical. The data for which the value is unknown is set, without value, in these integrated circuit images.

Possibly, a test card is produced with an office reader and then the pre-customization discussed hereinabove and, finally, the customization are performed by implementing the method and/or the device that are the subject of the present invention, by completing, for each entity, the values of the fields or data that are still blank.

Preferably, each group of customization data is associated with a "second" identifier, the term "first identifier" being reserved, throughout the description, for a portable electronic entity identifier generated from data retained in the non-rewritable memory ROM 130 of such an entity. The second identifier is typically the character string used to designate the platform.

The groups of data preferably include customization instructions, customization possibly concerning, in addition to the content of the memories of the portable electronic entity 100, its physical appearance, such as, for example, its embossing or the printing on its surface, or even the record on a magnetic strip. Regarding the customization of the content of the EEPROM memory, customization profiles (groups of customization data forming all the customization data common to all the portable electronic entities of the same type, defined by a mask or a mask and an integrated circuit) are browsed through to form and store these instructions. These instructions are, in one embodiment, APDU-format commands. It is possible, for example, to form all the APDU-format commands to create the file structure of the memory of a chip card. It is possible, in fact, to generate all the initialization commands, that are also called "pre-customization commands". The reader of this document can refer to the U.S. Pat. No. 6,196,459 for details of this pre-customization.

In some operating modes, the customization means generate the customization instructions from the data contained in the selected group of customization data. For example, if, when browsing through a group of customization data, a keyword is found that defines a file, the corresponding file instruction is formed. In some operating modes, APDU commands are incorporated in the image. In some operating modes, the body of the commands is prepared in APDU format that includes a variable part which is completed with customization data. The bodies of APDU commands which will be completed with the data specific to each holder at the time of customization are thus incorporated in the group of customization data.

As explained hereinabove, in particular embodiments, the groups of customization data include at least one image of the structure of at least a part of the memory of the portable electronic entity.

Thus, during the step 400, in FIG. 4, an image of the memory of the card (essentially, the file structure and the variables in TLV form) is produced, based on the selection of an application, and the customization instructions are preferably produced from this image, which makes it possible to adapt to the platform, to the machine, and therefore improve the flexibility of the customization. Possibly, the customization instructions are in the image.

During a step 405, the customization server 200 receives and stores a plurality of groups of customization data.

When preparing for the initialization of the batch, step 410, the batch of portable electronic entities to be customized is associated with a plurality of groups of customization data, in the memory of the customization server 200.

It will be noted that, in some embodiments, the steps 400 and 405 are performed on another computer, for example a laptop, the profiles or groups of customization data then being loaded into the server 200.

It will be observed that, at this stage, the groups of data do not yet have the values specific to the future entity holders.

During the step 320, a step 410 is performed first of all, during which the customization profile, formed, for example, by the memory image and possibly other parameters linked, for example, to the physical aspect of the portable electronic entity, is used to customize each entity of the batch, by incorporating in the previously defined memory image the data specific to each future holder.

The server 200 then chooses, from the integrated circuit images, the one that corresponds to each portable electronic entity in the batch. Then, the APDU-format commands are prepared as described hereinabove. During a step 415 corresponding to the step 310 of FIG. 3, the customization station 240 powers up or resets the portable electronic entity 100 and obtains, in response, from the entity 100, "ATR" (answer to reset) data. It will be recalled that the ATR calculation program is part of the mask (or operating system) that is stored in the read-only memory ROM 130 of the portable electronic entity 100. This calculation program can use information from the non-volatile rewritable memory EEPROM 120 and from the read-only memory ROM 130.

As a variant, the customization station 240 transmits a first identifier request to the portable electronic entity 100 and receives, in return, the first identifier.

During a step 420 corresponding to the step 315 of FIG. 3, the customization station 240 transmits the first identifier of the portable electronic entity 100 to the customization server 200. This first identifier is, possibly, complemented by an identifier of the customization station in order for the customization server to be able to address specific messages to this station.

During a step 425, the customization server 200 associates the first identifier, of the portable electronic entity, with at least one second identifier, of a group of customization data, for example by applying a mapping table.

These groups of data are stored, in the server 200, in association with the second identifiers, the history bytes corresponding respectively to the masks, to the masks associated with circuits and/or to the circuits of the portable electronic entities 100.

When said history bytes are obtained from the portable electronic entity that is to be customized, they are compared with those associated with the groups of customization data and each group of data for which the comparison is positive (this can be a match, inclusion, etc.) is chosen.

During a step 430, the groups of customization instructions are created, or formed, from customization data or profiles, that include, possibly, APDU commands and APDU-command bodies. While the APDU commands are at least partly generated during the step 400, during the step 430 those that have to be completed with data specific to the future holders of the portable electronic entities are completed.

During a step 435, the customization server 200 performs the necessary decoding and/or analysis, and transmits each APDU-format command in the group of instructions to the customization station.

Figure 6:
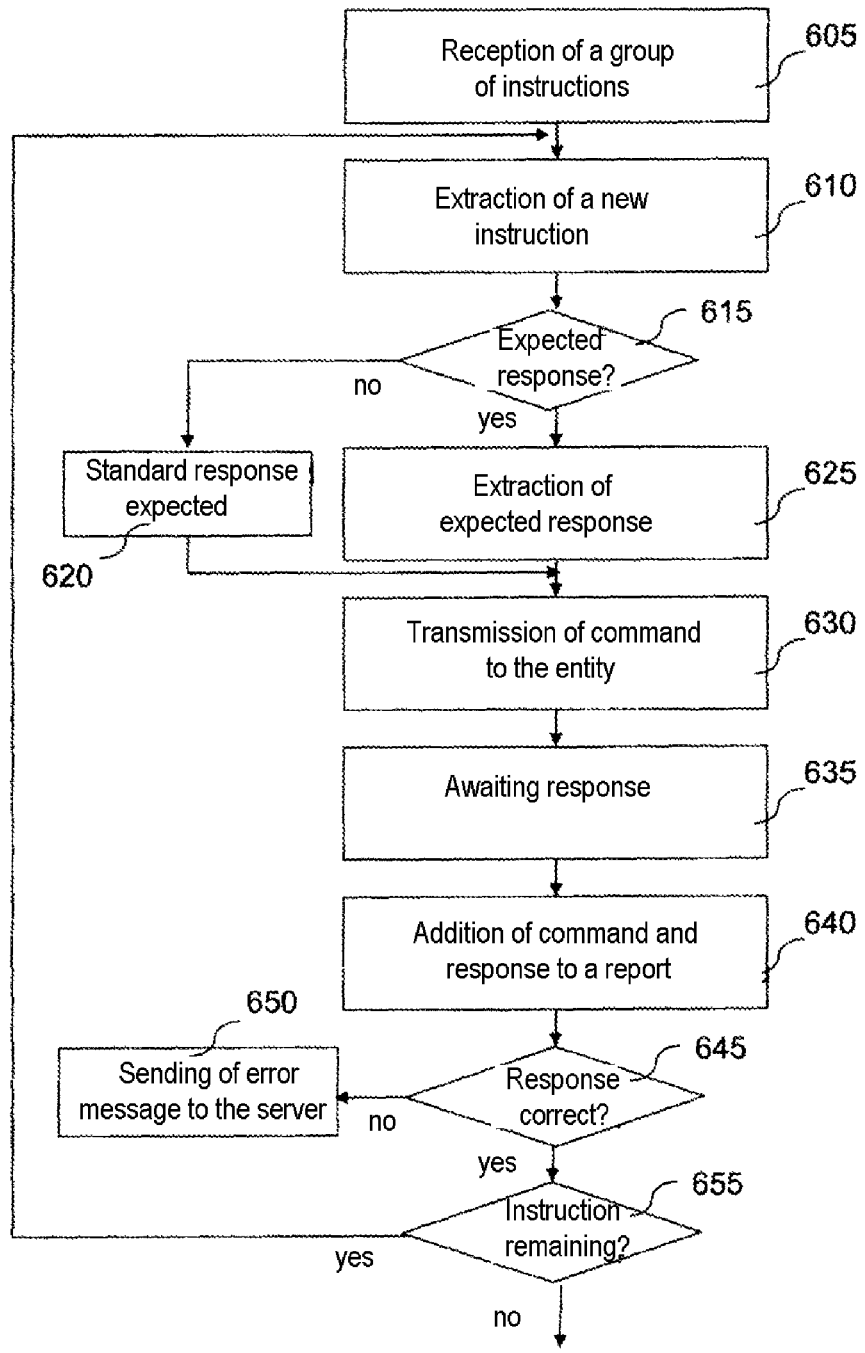
FIG. 6 is a flow diagram representing steps implemented in one of the steps illustrated in FIG. 3, and FIGS. 7A to 7I diagrammatically represent data frames interchanged between different entities to implement a particular embodiment of the method that is the subject of the present invention.

FIG. 6 illustrates the step 325 in detail. First of all, during a step 605, the customization station 240 receives a group of customization instructions from the server 200. Then, during a step 610, the customization station 240 performs an extraction of the next instruction of the last group of customization instructions received. On the first iteration of the step 610, the next instruction is the first instruction.

During a step 615, the customization station 240 determines whether the extracted instruction is associated with a control instruction, that is, in this case, identifies a response to be awaited from the portable electronic entity.

If there is such an association, during a step 625, the customization station 240 extracts, from the group of customization instructions, the identification of the response to be awaited. Otherwise, during a step 620, the customization station 240 stores, as the expected response, a standard response, independent of the customization instruction.

Following one of the steps 620 or 625, the customization station extracts the APDU-format command from the extracted instruction and transmits it to the portable electronic entity 100, during a step 630. For example, this instruction enables the portable electronic entity 100 to write data into the non-volatile memory EEPROM 140 of the portable electronic entity 100.

Then, during a step 635, the customization station 240 waits for a response from the entity 100. On receiving a response from the entity 100 or at the end of the maximum waiting time, the customization station writes the content of the command and the response, possibly empty, into a report buffer memory, chronologically during a step 640.

During a step 645, the customization station 240 determines whether the response obtained is identical to the expected response. If not, during a step 650, the station 240 sends an error message to the server 200 together with the content of the report buffer memory. If yes, during a step 655, the customization station 240 determines whether the last group of instructions received includes at least one more instruction. If not, the step 325 is completed. If yes, the process returns to the step 610.

Figure 5A:
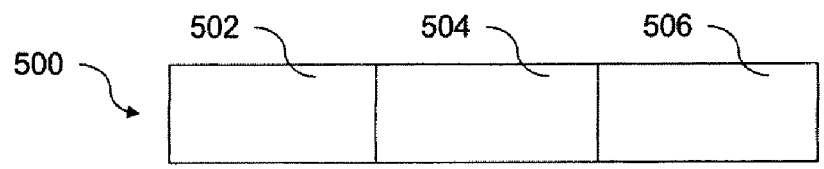

It can be seen in FIG. 5A that a customization initialization request 500, sent by the station 240 to the server 200, can include an initialization code 502, for example on 2 bytes, a batch number 504, for example on 2 bytes, and a station number 506, for example on 2 bytes.

The initialization request is sent once for each batch as indicated with regard to the step 300 in FIG. 3.

Figure 5B:
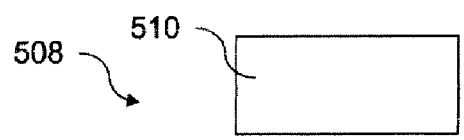
Figure 5C:
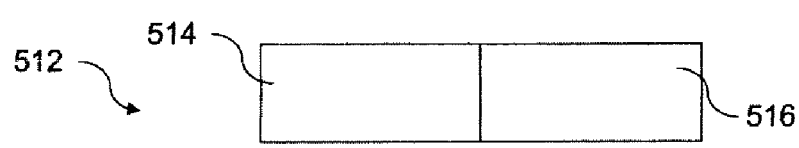

An example of response 508 from the server 200 is given in FIG. 5B. It includes an acknowledgement code 510. Another example of response 512 is given in FIG. 5C. It includes a reception fault code 514 and an error number 516.

Figure 5D:

When the batch is finished (the detection of the end of the batch is normally handled by a sensor of the station 240, or by a countdown of the portable electronic entities), the station 240 sends an end-of-customization message to the server. This message 518, illustrated in FIG. 5D, includes an end-of-batch code 520 and can include batch and/or customization machine identification information 522.

Figure 5E:
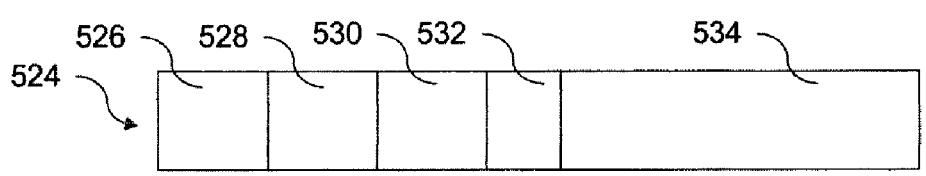

Once the acknowledgement to the customization initialization command is received, on detection of a new entity 100 in the reader 280, the station 240 communicates to the server 200, in a single command, the identifier, for example the ATR (answer to reset), of the entity 100 and a request for a group of customization instructions. An example of such a command 524 is illustrated in FIG. 5E. This command 524 includes an ATR communication code 526, a batch number 528, a customization station identifier 530, for example a customization station number, an ATR identifier length data 532 and the ATR identifier 534, of variable length.

It will be recalled that the ATR, the content of which is defined by the ISO 7816 standard, is the first response from a card after reset (typically on power-up). The ATR can contain, in the "history" bytes, information on the platform (circuit and mask or circuit or mask) communicated to the reader 280. It is in particular this information that is used by the server 200 to form the groups of customization instructions.

Figure 5F:

An example of response 536 from the server 200 is illustrated in FIG. 5F. This response 536 includes a header of a group of customization instructions 538 and a group of customization instructions 540, of variable length.

Figure 5G:
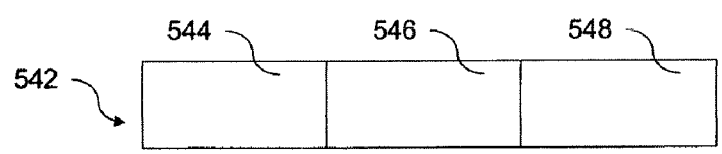

In another embodiment, the ATR identifier communication step is replaced by a simple request for a group of customization instructions sent by the station 240 to the server 200, on detection of a new entity 100, or, more generally, on starting a new batch of entities 100. An example of such a request 542 is illustrated in FIG. 5G and includes a request code 544, a batch code 546 and a station number 548.

Figure 5H:
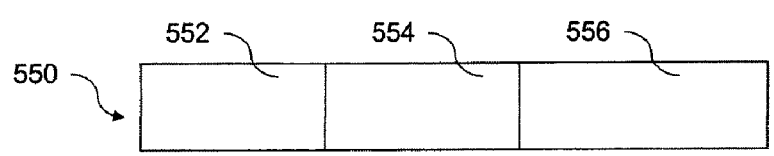

In this embodiment, the first group of instructions 550, sent by the server 200 to the customization station 240, includes a command to power up the portable electronic entity 100. An example of first group of instructions 550 is illustrated in FIG. 5H. It includes an instruction number 552, an instruction type 554 for the attention of the customization station 240 and a power-up instruction code 556.

Figure 5I:
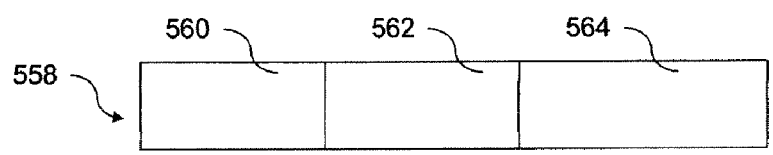

The customization station 240 then recovers and inserts the ATR identifier of the portable electronic entity in a report 558, an example of which is illustrated in FIG. 5I. It includes a report number 560, an ATR identifier length 562 and an ATR identifier 564, of variable length.

The server 200 then defines each group of customization instructions so that a group of instructions is completed only when, for the next instruction, the server needs the execution report of at least one of the preceding instructions.

For example, the first instruction of the new group of instructions is an instruction involved in a cryptographic process. For example, the last instruction of the preceding group of instructions can be an APDU-format command, called "get challenge" according to the ISO 7816 standard, which can be used to obtain a "challenge" from the card, that is, a random number, to enable the server 200 to be authenticated by calculating a calculated authentication code by encrypting the "challenge" on the basis of a key, using an external secured hardware module called HSM (hardware security module) and by sending this authentication code, by an APDU-format command called "external authenticator" according to the ISO 7816 standard, to the portable electronic entity 100, which then compares it with the authentication code that it has itself calculated from the same key, of the challenge, and by using cryptographic means that are specific to it, and which accepts the authentication if the two codes are equal.

Figure 7A:
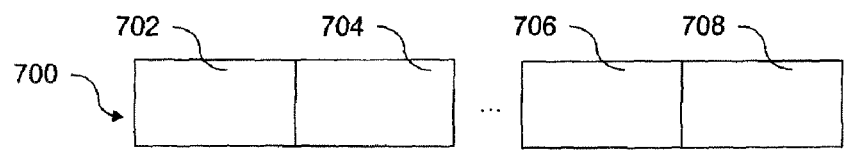

FIG. 7A illustrate details of a group of customization instructions 700. It includes a first instruction 702, a second instruction 704, and so on to the last instructions 706 and 708, each instruction having a variable length.

Figure 7B:
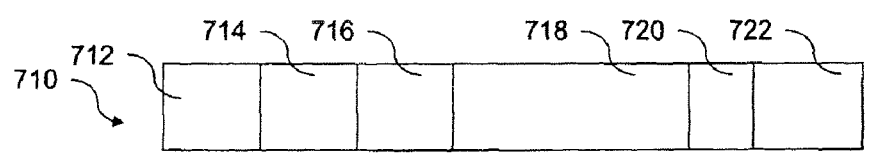

It will be seen in FIG. 7B that an instruction 710 addressed to the portable electronic entity 100 includes an instruction number 712 and an instruction type 714 which indicates whether an expected response is specified. The instruction 710 also includes an instruction length 716, an APDU-format command 718, an expected response length 720 and, optionally, according to the instruction type, an expected response content 722.

Figure 7C:
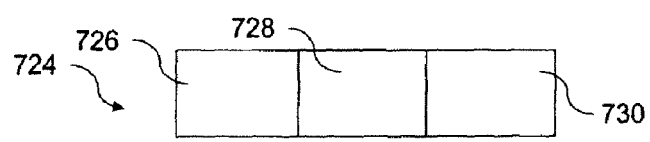
Figure 7D:
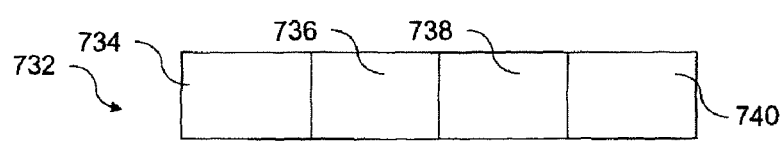

Two types of control instructions addressed to the customization station 240 are represented in FIGS. 7C and 7D. The control instruction type 724 includes an instruction number 726, an instruction type 728 and an instruction code 730. The control instruction type 732 includes an instruction number 734, an instruction type 736, an instruction code 738 and data 740. The instruction types 728 and 736 indicate that the instruction is addressed to the station 240. The instruction codes 730 and 738 indicate, for example, whether it is a power-up instruction, a power-down instruction, an instruction to modify the clock or a protocol selection instruction. The data 740 indicates, for example, a clock frequency or a voltage to be supplied to the entity 100. In the latter cases, the report instructions are implicit.

Figure 7E:
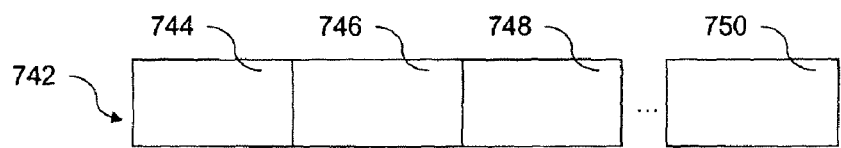

FIG. 7E illustrates an example of a report 742 transmitted by the customization station 240 to the server 200. This report 742 includes a report code 744, a first report information item 746, a second report information item 748 and so on to a last report information item 750, each of the report information items having a variable length.

Figure 7F:
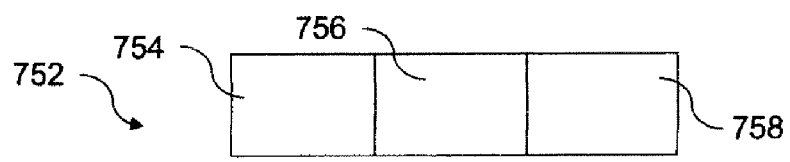

An example of a report information item 752 is given in FIG. 7F. This report instruction 752 includes an instruction number 754, a response length 756 and a response 758 of variable length.

On receipt of the report, the server 200 analyzes said report, processes any anomalies (for example, by stopping the customization) and sends a new group of customization instructions to the customization station 240 in order to continue the customization process. When the customization of a portable electronic entity is finished, the server 200 sends a specific instruction to the customization station 240. The customization station 240 can then automatically unload the portable electronic entity 100 from the reader 280 in order for the station 240 to continue the customization process, for example, by an embossing step on the same station or on a different station, and automatically load a new entity 100 in the reader 280 in order to initiate the electrical customization of that entity 100.

Figure 7G:
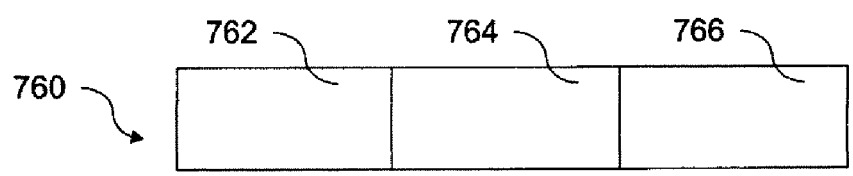

An example of a specific end-of-customization instruction 760 is illustrated in FIG. 7G. In some embodiments, the specific instruction representative of the end of customization is the only customization instruction of a group of customization instructions. This provision is advantageous in that it enables the server to analyze all the reports concerning a portable electronic entity before transmitting the instruction representative of the end of customization. This specific instruction 760 includes an instruction number 762, an instruction type 764 which specifies that this instruction is addressed to the station 240 and an end-of-customization without anomaly instruction code 766.

Figure 7H:
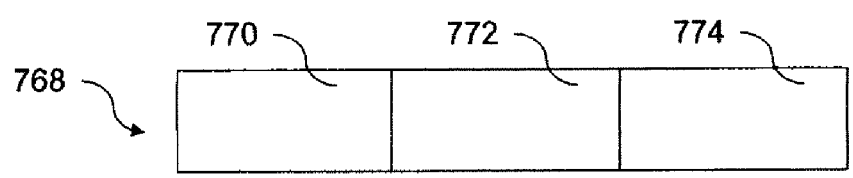

When the customization is finished, but includes anomalies, the server 200 sends a specific instruction 768 to inform the customization station 240, and therefore the operator of that customization station 240. An example of such a specific instruction 768 is illustrated in FIG. 7H and includes an instruction number 770, an instruction type 772 which specifies that this instruction is addressed to the customization station 240 and an end-of-customization with anomaly instruction code 774.

The end-of-customization instruction, with or without anomaly, can be located at the end of a group of customization instructions. Preferably, this instruction is placed in a group with no other instruction. It is also possible to provide a similar message sent by the server 200 to signal the end of customization of a batch of portable electronic entities 100.

Figure 7I:
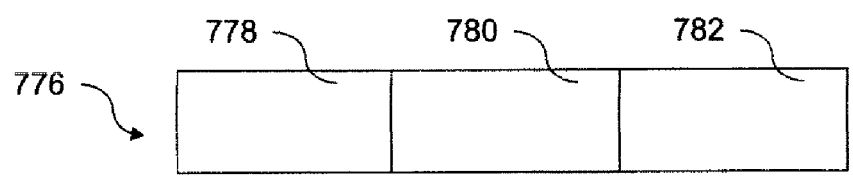

Preferably, the customization station 240 includes means of transmitting, to the server 200, an anomaly message and, in the case that an anomaly is detected, the customization server 200 stops the customization (which can thus be resumed later). An example of a station anomaly instruction 776 is illustrated in FIG. 7I. This instruction 776 includes an anomaly instruction code 778, a station number 780 and an anomaly code 782.

Obviously, the data interchanged between the server 200 and the station 240 can be coded according to any cryptographic protocol or algorithm.

Numerous variants or enhancements can be envisaged for the customization system. For example:
- provision can be made to have more complex control instructions performed on the customization station. Thus, the latter may possibly be directly linked to an HSM, and a control instruction can consist in exchanging information with this HSM to perform an authentication as described above;
- it is also possible to provide more complex report instructions, for example making it possible to place only a part of the responses from the electronic entity in the report, or insert the result of a processing operation, for example partly arithmetical, performed by the station based on the responses from the electronic entity;
- in order to improve the rate of customization, the control instructions produced by the customization station can be executed in parallel with the interchanges with the portable electronic entity. Thus, by waiting for the response from the electronic entity to a customization instruction, the customization station can analyze the response from the preceding customization instruction and insert the necessary information into said report;
- also in order to improve the rate of customization, the preparation of the groups of instructions by the server can be handled in parallel with the execution of the groups of instructions by the customization station. In practice, a part of the instructions of a new group of instructions is independent of the report for the preceding group of instructions. The server can thus prepare this part of the instructions of a new group of instructions while the preceding group of instructions is being executed by the customization station.

The invention claimed is:

1. A device for customizing a portable electronic entity of a batch of electronic entities, comprising:
    storage elements for storing a plurality of groups of customization data, at least one group of customization data comprising a customization profile associated with a type of portable electronic entity and defining general characteristics of a customization for said type of portable electronic entity;
    associating elements, for associating to the batch of electronic entities a plurality of said stored groups of customization data,
    communication elements for communicating with a non-rewritable memory of said portable electronic entity, for receiving a first identifier retained in said non-rewritable memory, said first identifier being at least a part of a message supplied by the portable electronic entity when it was powered up;
    selection elements for selecting at least one group of customization data according to the batch of electronic entities and the first identifier, at least one of the selected groups comprising the customization profile of said type of the customized entity; and
    customization elements for customizing said portable electronic entity according to each selected group of customization data.

2. The device according to claim 1, wherein the storage elements are designed so that each group of customization data is associated with a second identifier, the device includes association elements for associating a second identifier with said first identifier, wherein the selection elements are adapted to select at least one group of customization data according to the second identifier corresponding to the first identifier.

3. The device according to claim 1, wherein:
    the communication elements are designed so that said electronic entity conforms at least partly to the ISO 7816 standard and so that said message is an ATR ("answer to reset"), and
    the communication elements are adapted to perform a reset of the portable electronic entity and to receive the first identifier in at least part of a message supplied by the portable electronic entity when it was reset.

4. The device according to claim 1, wherein the communication elements are adapted to receive a first identifier that includes at least one "history" byte according to the ISO 7816 standard (bytes T1, T2, . . . T9) of the ATR.

5. The device according to claim 1, wherein:
the storage elements are designed so that said groups of customization data include at least one image of the structure of the non-volatile memory of the portable electronic entity, representative of the content and file size of the portable electronic entity and of the memory areas of the portable electronic entity containing variables, and their value, excluding data specific to the future holder of the portable electronic entity, and
the customization elements are adapted to complete the blank fields of said structure image with customization data.

6. The device according to claim 1, wherein the electronic entity is a secured microcontroller card conforming at least partly to the ISO 7816 standard.

7. The device according to claim 1, further comprising:
processing elements adapted to process said customization data and to generate at least one group of instructions for customizing the portable electronic entity, at least one group of customization instructions including at least one customization control instruction enabling a customization station to control the correct execution of at least one customization instruction, at least one customization instruction of a group of customization instructions enabling the portable electronic entity to write data into the memory of the portable electronic entity; and
transmission elements for transmitting each group of customization instructions.

8. The device according to claim 7, wherein the processing elements are also adapted to generate at least one customization report instruction enabling the customization station to confirm to the device that at least a part of a group of customization instructions has been correctly executed, and to insert at least one report instruction in at least one group of customization instructions, the transmission elements being adapted to transmit at least one report instruction addressed to the customization station, the device also including receiving elements for receiving at least one report originating from the customization station.

9. The device according to claim 7, that also includes analysis elements adapted to analyze at least one received report and initiating an action according to the result of said analysis.

10. The device according to claim 7, wherein the processing elements include defining elements for defining groups of customization instructions such that the processing elements need the execution report of at least one of the preceding instructions to generate the first instruction of the next group of customization instructions.

11. The device according to claim 7, wherein the communication elements are designed also to receive at least one identifier of said customization station.

12. The device according to claim 7, wherein the processing elements are adapted to generate at least one group of customization instructions in parallel with the execution of a group of customization instructions by the customization station.

13. The device according to claim 1, further comprising:
receiving elements for receiving at least one group of customization instructions from the portable electronic entity, at least one group of instructions including at least one customization control instruction making it possible to control the correct execution of at least one customization instruction, at least one customization instruction of a group of customization instructions enabling the portable electronic entity to write data into the memory of the portable electronic entity;
transmission elements for transmitting at least one customization instruction to the portable electronic entity; and
processing elements adapted to process each control instruction to control the correct execution of at least one customization instruction by the portable electronic entity.

14. The device according to claim 13, wherein the processing elements are adapted to perform at least one control instruction on at least one customization instruction after the transmission elements have transmitted, to the portable electronic entity, another customization instruction unaffected by said control instruction.

15. The device according to claim 13, wherein the reception elements are also adapted to receive at least one customization report instruction and the processing elements are also adapted to prepare an execution report on at least one group of customization instructions, the device also including transmission elements for transmitting reports to a customization server.

16. The device according to claim 13, wherein the reception elements are adapted to extract at least one report instruction from at least one group of customization instructions.

17. The device according to claim 1, further comprising:
a means for obtaining a customization profile adapted to
choose at least one application from a predefined list of applications,
configure at least one parameter associated with each chosen application,
select a hardware platform, from a list of compatible platforms determined according to at least one chosen application and at least one configured parameter, and
obtain a customization profile according to at least one chosen application, at least one configured parameter and the selected platform.

18. A method for customizing a portable electronic entity of a batch of electronic entities, comprising:
a step for storing, in a customization device, a plurality of groups of customization data, at least one group of customization data comprising a customization profile associated with a type of portable electronic entity and defining general characteristics of a customization for said type of portable electronic entity;
a step of associating, with associating elements, a plurality of said stored groups of customization data to the batch of electronic entities;
a step for communicating with a non-rewritable memory of said portable electronic entity, to receive a first identifier retained in said non-rewritable memory, said first identifier being at least a part of a message supplied by the portable electronic entity when it is powered up;
a step for selecting, by said customization device, at least one group of customization data according to the batch of electronic entities and the first identifier, at least one of the selected groups comprising the customization profile of said type of the customized entity; and
a step for customizing said portable electronic entity according to each selected group of customization data.

19. The method according to claim 18, further comprising:
a step of choosing at least one application from a predefined list of applications;
a step of configuring at least one parameter associated with each chosen application;

a step of selecting a hardware platform, from a list of compatible platforms determined according to at least one chosen application and at least one configured parameter; and a step of obtaining a customization profile according to at least one chosen application, at least one configured parameter and the selected platform.

\* \* \* \* \*

UNITED STATES PATENT AND TRADEMARK OFFICE
CERTIFICATE OF CORRECTION

PATENT NO. : 8,424,770 B2  Page 1 of 1
APPLICATION NO. : 12/513716
DATED : April 23, 2013
INVENTOR(S) : Mounier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 559 days.

Signed and Sealed this
Eighth Day of September, 2015

Michelle K. Lee
*Director of the United States Patent and Trademark Office*